(12) United States Patent
Chuang et al.

(10) Patent No.: US 7,055,156 B2
(45) Date of Patent: May 30, 2006

(54) APPARATUS FOR REDUCING TRAY-IN NOISE

(75) Inventors: Cheng-Chieh Chuang, Sanchung (TW); Chiu-An Huang, Yunlin (TW); Hsien-Tsung Chiu, Taoyuan (TW)

(73) Assignee: Benq Corporation, Taoyuan (TW)

( * ) Notice: Subject to any disclaimer, the term of this patent is extended or adjusted under 35 U.S.C. 154(b) by 29 days.

(21) Appl. No.: 10/339,817

(22) Filed: Jan. 10, 2003

(65) Prior Publication Data
US 2003/0133399 A1    Jul. 17, 2003

(30) Foreign Application Priority Data
Jan. 15, 2002    (TW)    ............................... 91100484 A

(51) Int. Cl.
*G11B 17/04* (2006.01)
(52) U.S. Cl. ..................................... 720/604; 720/690
(58) Field of Classification Search ................ 720/604, 720/690
See application file for complete search history.

(56) References Cited

U.S. PATENT DOCUMENTS

| | | | |
|---|---|---|---|
| 4,829,510 A | | 5/1989 | Takahashi |
| 4,926,410 A | * | 5/1990 | Suzuki et al. ................ 720/724 |
| 5,323,381 A | * | 6/1994 | Takahashi et al. ........... 369/282 |
| 5,796,709 A | * | 8/1998 | Ootsuka ....................... 720/704 |
| 6,160,780 A | * | 12/2000 | Furukawa et al. ........... 720/604 |
| 6,208,613 B1 | * | 3/2001 | Iizuka .......................... 720/707 |
| 6,549,508 B1 | * | 4/2003 | Matsumoto et al. ......... 369/264 |
| 2002/0196728 A1 | * | 12/2002 | Morishita .................... 369/264 |

FOREIGN PATENT DOCUMENTS

JP       2000117770 A  *  4/2000

\* cited by examiner

*Primary Examiner*—Brian E. Miller
(74) *Attorney, Agent, or Firm*—Snell & Wilmer L.L.P.

(57) ABSTRACT

While a tray moves into a disk drive, a clamper and a turntable are used to clamp a disk. While the tray is moving into the disk drive without a disk thereon, the clamper and turntable hit with each other, which generates an uncomfortable noise. The apparatus for reducing the noise is an improved clamper with holes thereon. Alternatively, the clamper is replaced by a clamping part, which includes a metal plate and a plastic plate. The plastic plate has a holder, which clips tight an extension of the metal plate. Therefore, the noise, which is generated from the collision of metal plate and the turntable, is reduced.

4 Claims, 10 Drawing Sheets

APPARATUS FOR REDUCING TRAY-IN NOISE

This application claims priority of Taiwan Patent Application Serial No. 91100484 entitled "Apparatus for Reducing Tray-in Noise", filed on Jan. 15, 2002.

FIELD OF INVENTION

The present invention relates to reducing noise in a disk drive and especially to noise generated from the clamper and the turntable hitting each other without a disk on the tray.

BACKGROUND OF THE INVENTION

When a tray with a disk moves into a disk drive, a clamper and a turntable are used for clamping and rotating the disk. Please refer to FIG. 1. During operation of a disk drive 4, disk 1 is placed on a tray 2 and then the tray 2 moves into the disk drive 4. After the disk on the tray moves into the disk drive 4, the clamper 3 and the turntable (located under the clamper and not shown in the FIG. 1) are clamping the disk together on the tray. The relationship of the clamper 3 and the turntable 5 is as shown in FIG. 2. The clamper 3 is usually made by metal, such as stainless steel, and the turntable 5 has a magnet disposed thereon. When the tray 2 moves into disk drive 4 with the disk 1 thereon, the magnet on the turntable 5 attracts the clamper 3 to clamping the disk.

However, the tray 2 does not always move into the disk drive 4 with a disk thereon. When the tray 2 moves into the disk drive 4 without a disk thereon, the magnet on the turntable 5 still attracts the clamper 3 as shown in FIG. 3a. FIG. 3b is a cross-sectional diagram along the line I–I' in FIG. 3a. When the tray is introduced into the disk drive without a disk thereon, the clamper 3 and the turntable 5 are adjacent to each other due to the magnet on the turntable 5 attracting the clamper 3. In the attracting process, the clamper 3 and the turntable 5 hit each other and a hitting noise is produced.

FIG. 3c is an enlarged diagram showing a region, which is encircled in the FIG. 3b, near the central portion of the clamper 3. Hitting energy produced from the clamper 3 and the turntable hitting each other makes the clamper 3 vibrate and noise is generated.

In order to reduce noise in a disk drive, the present invention replaces the clamper 3 with an improved one to reduce noise from the vibration of the clamper 3.

SUMMARY OF THE INVENTION

An aspect of the present invention is reducing noise generated from the clamper and the turntable hitting each other when the tray moves into the disk drive without a disk thereon.

In a preferred embodiment, at least one hole is located on the clamper to reduce noise.

In another preferred embodiment, the clamper is replaced by a clamper part. The clamper part includes a metal plate and a plastic plate. The metal clamper has extensions and the plastic plate has holders. When the metal plate and the plastic plate are assembled, each holder clip engages the corresponding extension and noise generated from the metal plate and the turntable hitting each other is reduced.

DETAILED DESCRIPTION

When the tray moves into the housing 5 without a disk thereon, a clamper 3 and a turntable 5 hit each other and noise is generated. The turntable is movably disposed under the clamper 3. When the turntable 5 is in a raised position, a central portion of the turntable is adjacent to the clamper 3. When the turntable 5 is in a lower position, the central portion of the turntable 5 is separated from the clamper 3. When the turntable 5 moves from the lower position to a raised position, the turntable 5 hits the clamper 3. Thus the clamper 3 vibrates and noise is generated by hitting energy. The objective of the present invention is to reduce noise described above.

Figure 1:
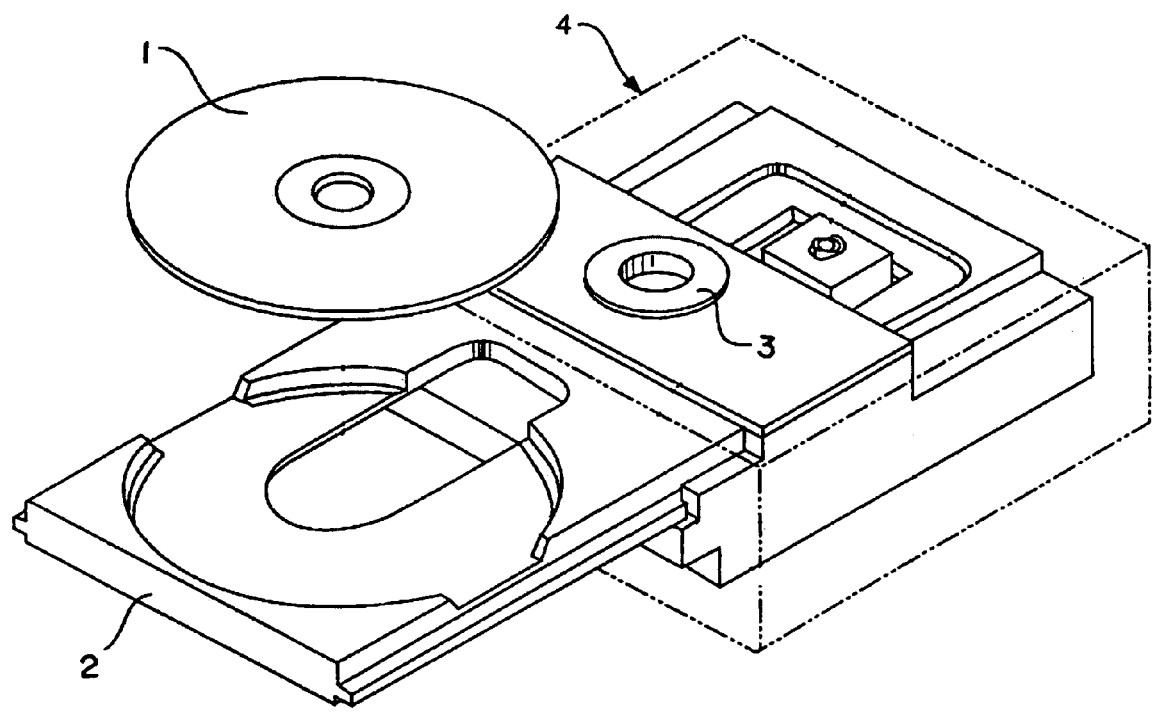
FIG. 1 is a schematic diagram showing a conventional disk drive.
Figure 2:
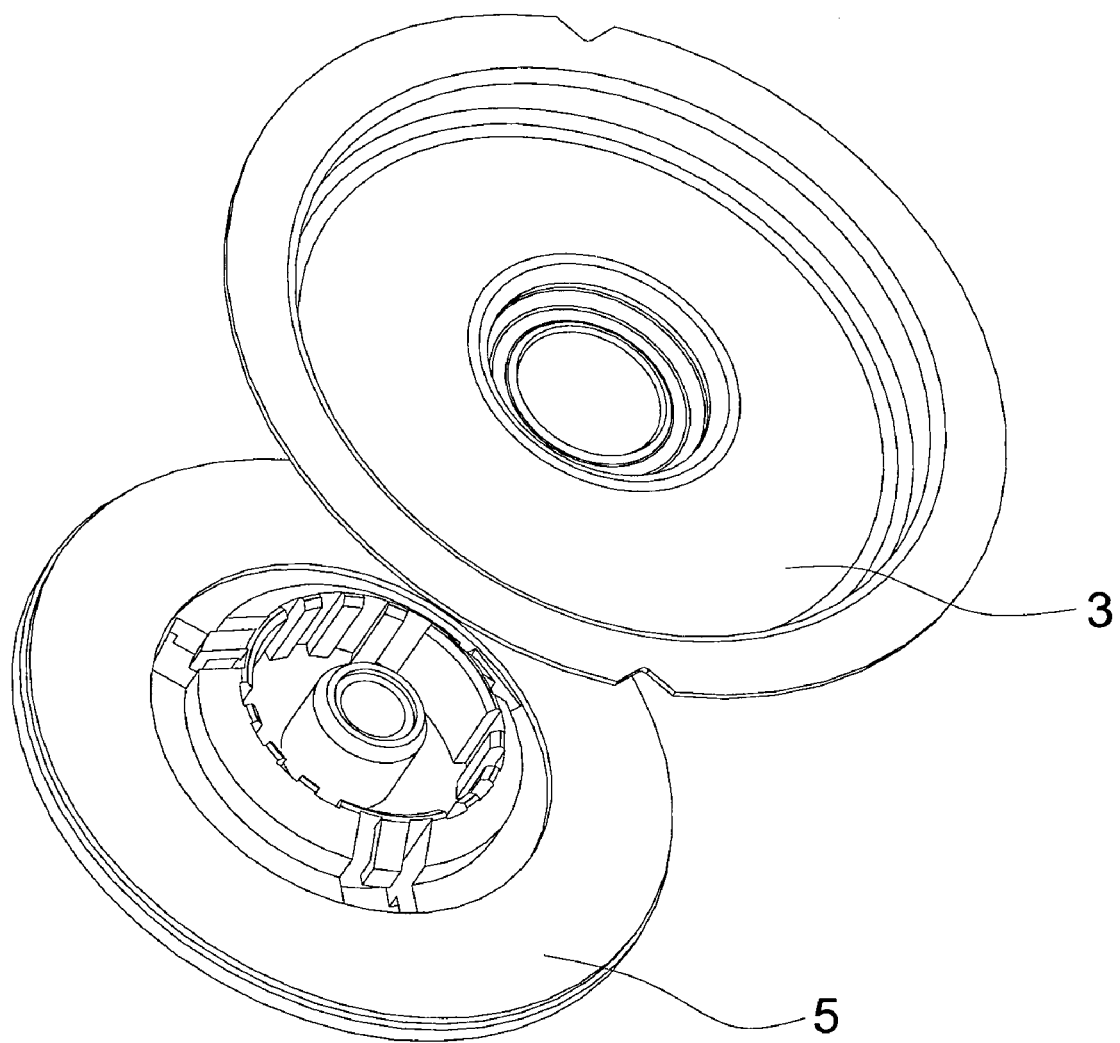
FIG. 2 is a schematic diagram showing that the relationship of a conventional clamper and a turntable.
Figure 3A:
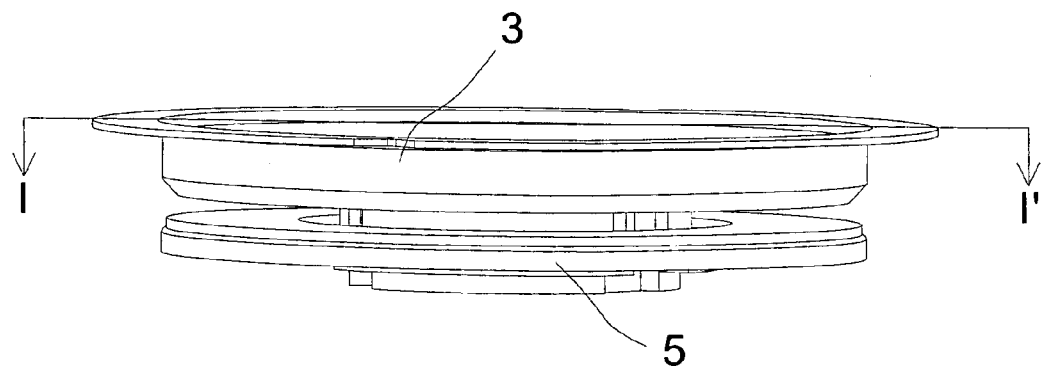
FIG. 3a to FIG. 3c are schematic diagrams showing the relationship of the clamper and the turntable when the tray is introduced in the disk drive without a disk thereon.
Figure 3B:
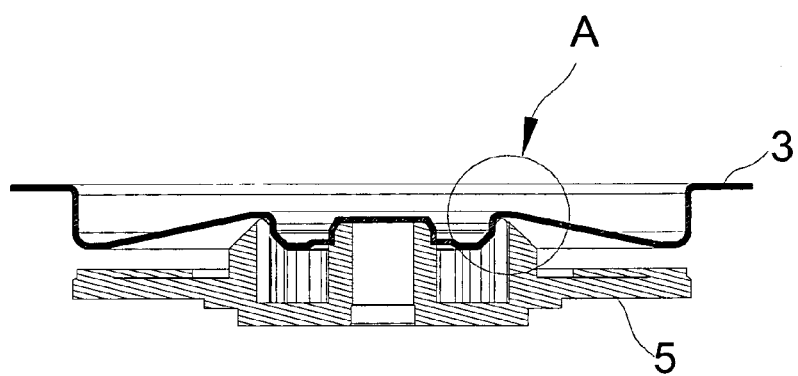
Figure 3C:
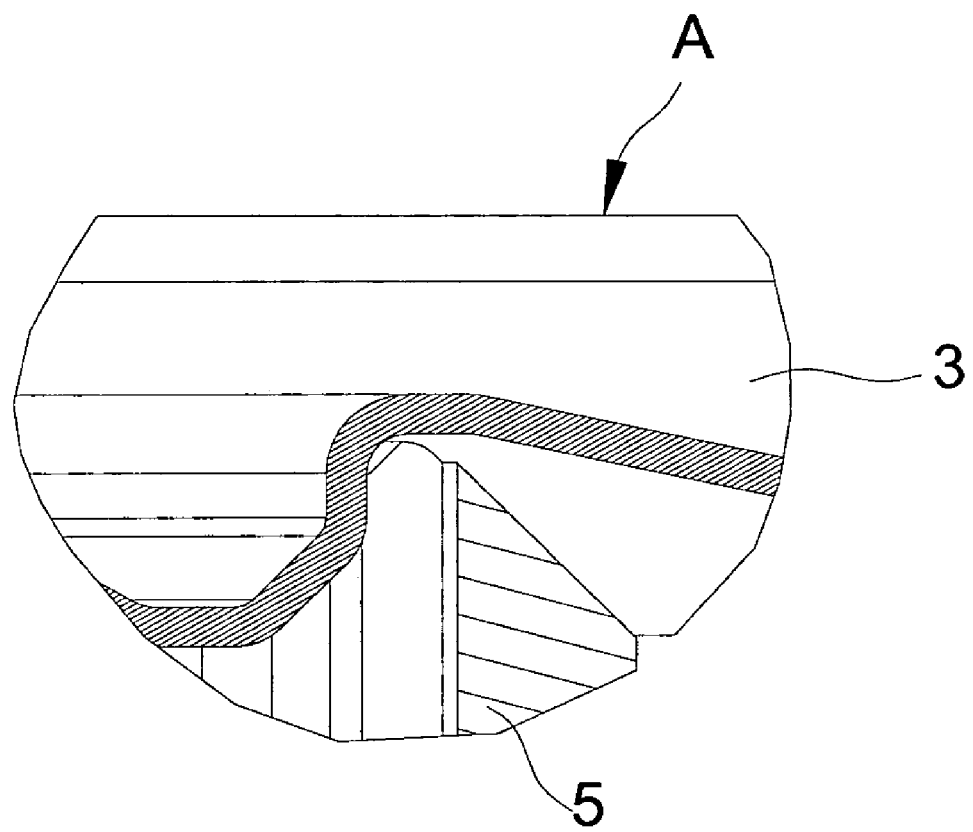
Figure 4A:
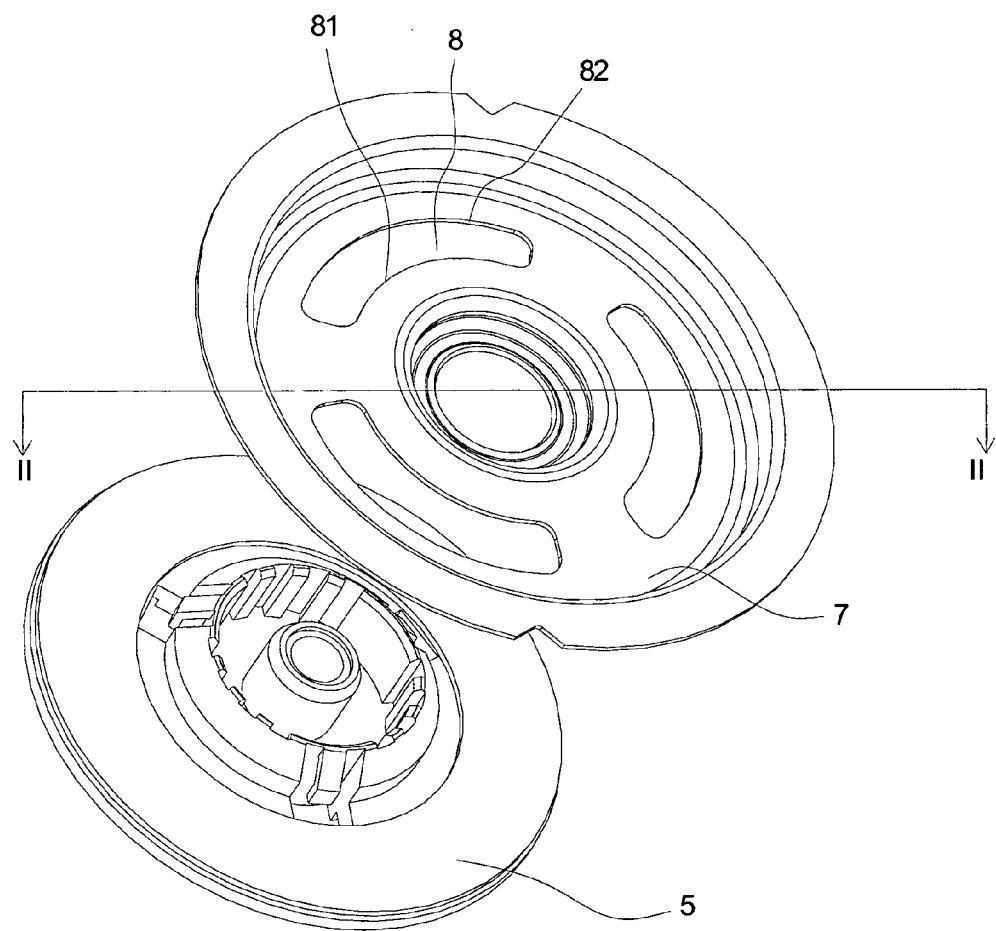
FIG. 4a to FIG. 4b illustrate the first preferred embodiment of the present invention.
Figure 4B:
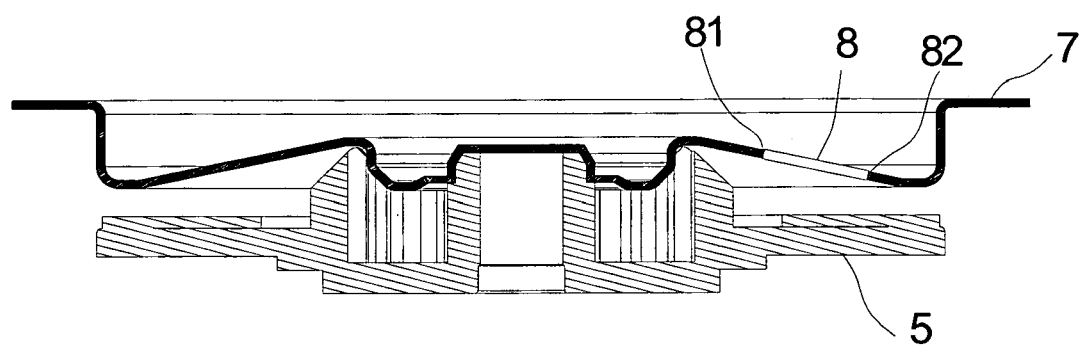

Please refer to FIG. 4a, which is a schematic diagram showing that the clamper 7 of the present invention is adjacent to the turntable 5 while the tray is introduced into the disk drive without a disk thereon. FIG. 4b is a cross-sectional view of FIG. 4a along line II–II'. The clamper 7 has at least one hole 8, which has a rim with an inner portion 81 and an outer portion 82, located thereon. The inner portion 81 of the rim is near the center of the clamper 7, and the outer portion 82 of the rim is near the circumference of the clamper 7. As shown in FIG. 4a, the clamper 7 has three holes 8 located thereon. It is preferable that a weight distribution of the clamper 7 is symmetrical along its axis, such that the disk is balanced and steady in the disk drive even when disk rotates at a high drive speed.

When the clamper 7 and the turntable 5 hit each other, part of the clamper 7 begins vibrating. However, when the vibration wave travels from a hitting point to the circumference of the clamper 7, the vibration wave meets the inner portion 81 of the rim and can not travel through the holes 8. Thus the vibration wave travel to near the circumference of the clamper 7 is impeded and the resonance of the vibration and noise are reduced.

Figure 5A:
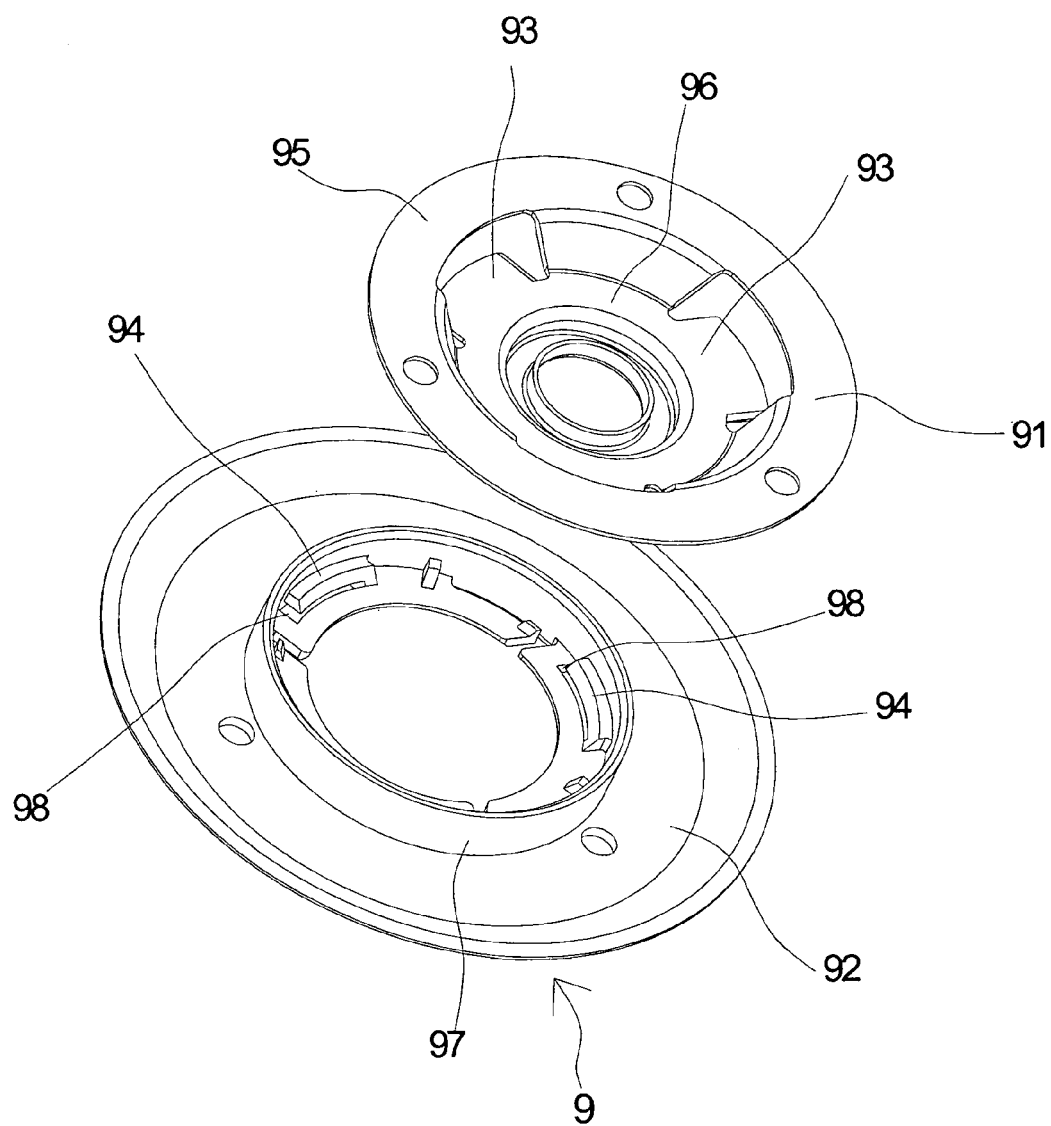
FIG. 5a to FIG. 5c and FIG. 6a to FIG. 6b illustrate the second preferred embodiment of the present invention.
Figure 5B:
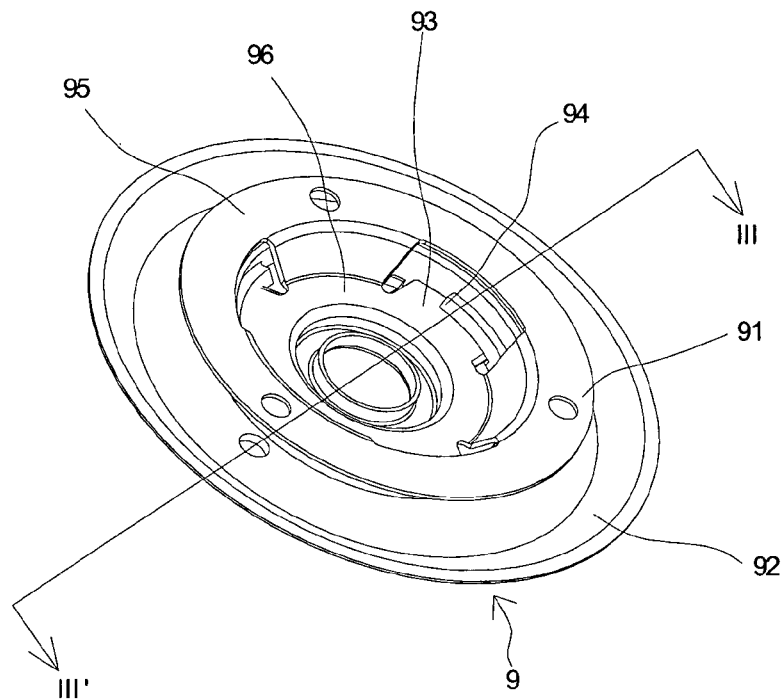
Figure 5C:
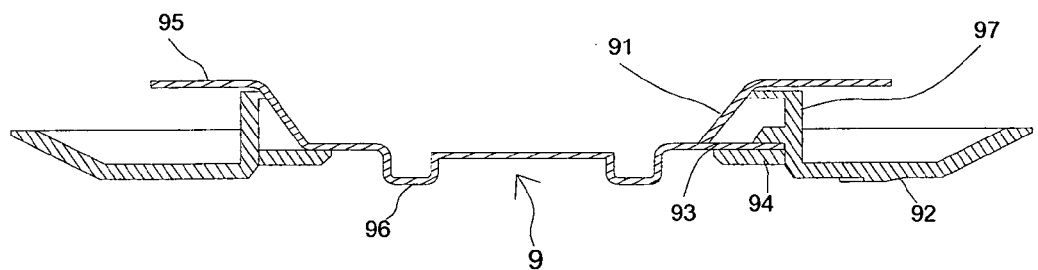

Please refer to FIGS. 5a to 5c, which show another embodiment of the present invention. The conventional clamper 3 is replaced by the clamper part 9. The clamper part includes a metal plate 91 and a plastic plate 92, as shown in FIG. 5a. A central portion of the metal plate 91 is hollow to form an upper edge 95 and a bottom portion 96. The bottom portion 96 has a plurality of extensions 93 and an interval between the upper edge 95 and the extensions 93. The plastic plate 92 has a circular protrusion 97 therein, and a plurality of holders 94 disposed in the circular protrusion 97. An opening 98 is located in the counterclockwise side of each holder 94. When the metal plate 91 and the plastic plate 92 assemble, the metal plate 91 rotates in clockwise direction and each extension 93 enters corresponding holder 94 via the opening 98.

An assembly process of the metal plate 91 and the plastic plate 92 is as follows. First, a user puts the metal plate 91 on the plastic plate 92. Second, the user rotates metal plate 91 in a clockwise direction and enters each extension 93 into corresponding holder 94 via the opening 98. Thus, the metal plate 91 and the plastic plate 92 are tightly assembled together. The number of the extensions 93 and the holders 94 are decided by specific demand. For example, the clamper part in the FIG. 5a has three pairs of the extensions 93 and holders 94. FIG. 5c is a cross-sectional view of FIG. 5b along line III–III'. It is clear in FIG. 5c that each holder 94 clip tightly engages the corresponding extension 91 and the circular shape protrusion 97 is against a bottom surface the upper edge 95.

Figure 6A:
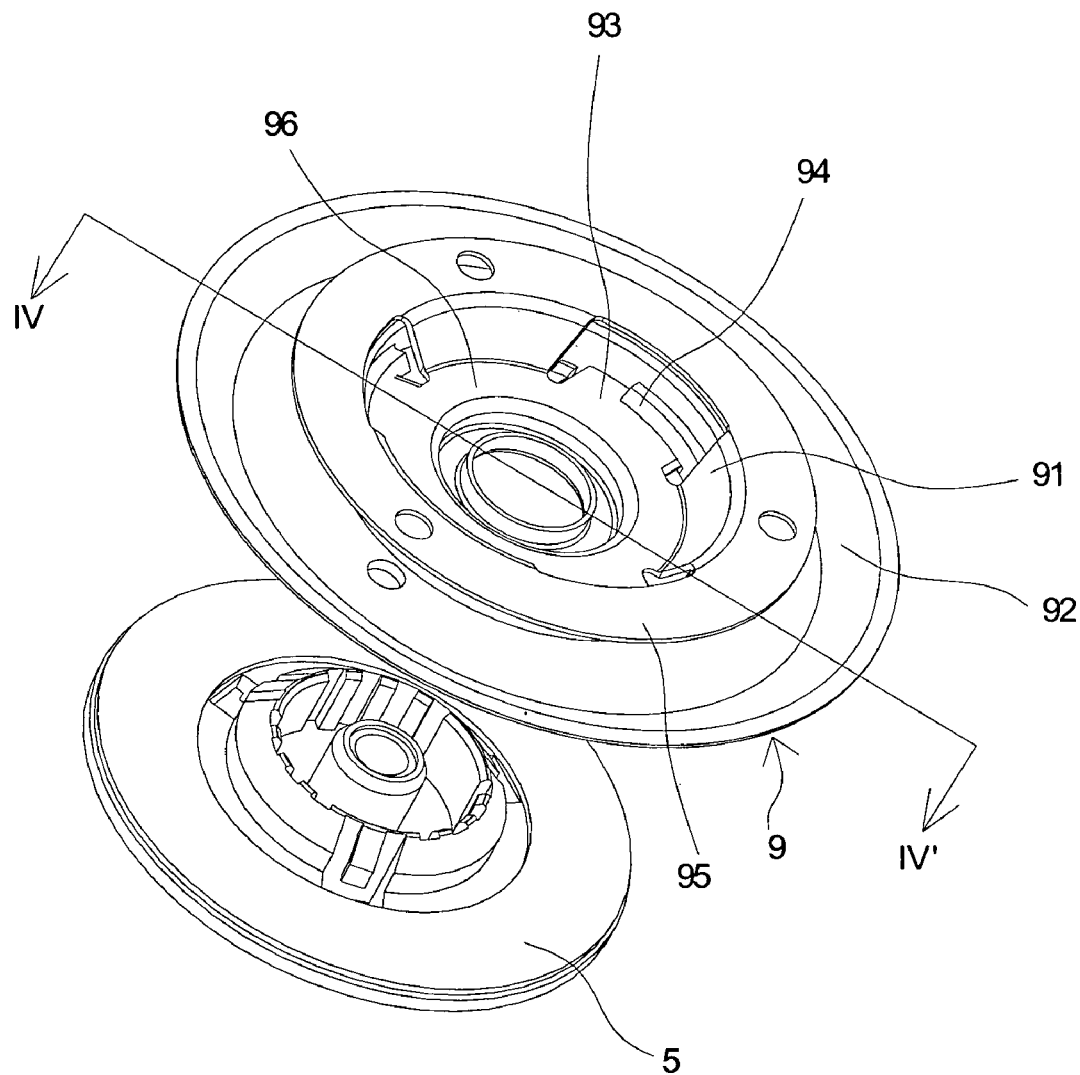
Figure 6B:
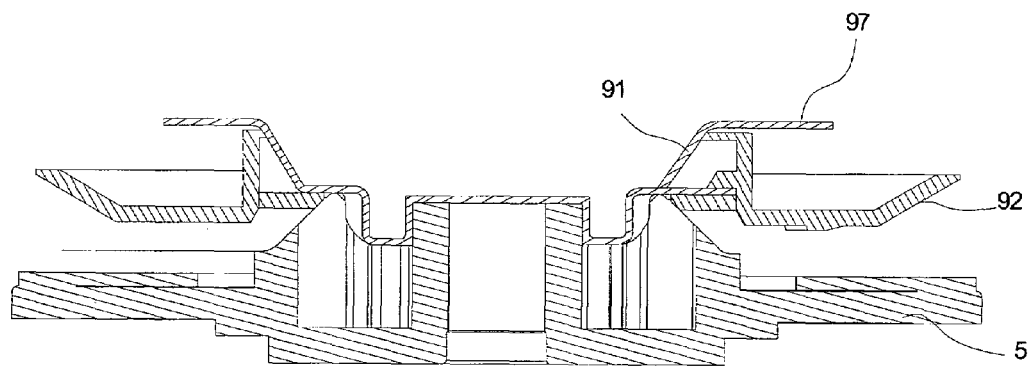

Please refer to FIG. 6a, which is a schematic diagram showing that relative positions of the clamper part 9 and the turntable 5. FIG. 6b is a cross-sectional view along the line IV—IV in FIG. 6a. When the disk tray 2 is introduced into the disk drive 4 with a disk 1 thereon, the clamper part 9 and the turntable 5 hit each other and the metal plate 91 vibrates. The holder 94 clips tight the extension 93, and hitting energy is transferred from metal plate 91 to the plastic plate 92. Therefore vibration the metal plate 91 decreases and the noise is reduced.

While this invention has been described with reference to several illustrative embodiments, this description is not intended to be constructed in a limiting sense. Various modifications of the illustrative embodiments, as well as other embodiments of the invention, will be apparent to persons skilled in the art upon reference to this description. It is therefore contemplated that the appended claims will cover any such modifications or embodiments as falling within the true scope of the invention.

We claim:

1. An apparatus for reducing noise in a disk drive, including a clamping part and a turntable used together for holding a disk on a tray, the clamping part consisting of a metal plate and a plastic plate, a central portion of the metal plate being hollow to form a bottom portion, the bottom portion having a plurality of extensions, the plastic plate having a plurality of holders, when the metal plate and the plastic plate are assembled as the clamping part, the holders clipping the extensions tight, the turntable being selectively moved in a first position and a second position, when the turntable is in the first position, a central portion of the turntable is adjacent to the metal plate, and when the turntable is in the second position, the central portion of the turntable is separated from the metal plate, the apparatus comprising:

an extension disposed on the metal plate; and a holder disposed on the plastic plate;

wherein the holder clips tight the extension, reducing noise generating from the metal plate and the turntable hitting each other when the tray moves into the disk drive without the disk on the tray.

2. A disk drive, the disk drive comprising:

a clamping part comprising a metal plate and a plastic plate, a central portion of the metal plate being hollow to form a bottom portion, the bottom portion having a plurality of extensions, the plastic plate having a plurality of holders, when the metal plate and the plastic plate are assembled as the clamping part, the holders clipping the extensions tight; and a turntable being selectively in a first position and a second position, when the turntable is in the first position, a central portion of the turntable is adjacent to the metal plate, and when the turntable is in the second position, the central portion of the turntable is separated from the metal plate;

wherein when the turntable moves from the second position to the first position, the plurality of holders clipping the extensions tight such that noise generating from the clamping part and the turntable hitting each other is reduced.

3. The disk drive according to claim 2, the metal plate further comprising an upper edge, an interval being between the upper edge and the extensions, the plastic plate further comprising a circular shaped protrusion, the circular shaped protrusion being against a bottom surface of the upper edge.

4. The disk drive according claim 3, wherein an opening is located in the counterclockwise side of each holder, such that when the metal plate and the plastic plate are assembled, the metal plate rotates in a clockwise direction and each of the extensions enters a corresponding holder via the opening.

* * * * *